United States Patent
Athanassiou et al.

(10) Patent No.: US 7,108,384 B1
(45) Date of Patent: Sep. 19, 2006

(54) PATROL VEHICLE SAFETY MIRROR

(76) Inventors: Theophilos Athanassiou, 41 Hewitt Ave., Staten Island, NY (US) 10301; Gaetano Montante, 104 Sweetmans La., Manalapan, NJ (US) 07726

( * ) Notice: Subject to any disclaimer, the term of this patent is extended or adjusted under 35 U.S.C. 154(b) by 0 days.

(21) Appl. No.: 10/619,138

(22) Filed: Jul. 14, 2003

Related U.S. Application Data

(60) Provisional application No. 60/396,307, filed on Jul. 16, 2002.

(51) Int. Cl.
*G02B 7/182* (2006.01)
(52) U.S. Cl. .................. 359/876; 359/840; 248/481
(58) Field of Classification Search ............ 359/840, 359/844, 850, 855, 864, 865, 872, 876; 248/476, 248/479, 481
See application file for complete search history.

(56) References Cited

U.S. PATENT DOCUMENTS

| | | | | |
|---|---|---|---|---|
| 2,302,952 A | * | 11/1942 | Pfeifer | 359/862 |
| 2,615,368 A | * | 10/1952 | Bindley | 248/481 |
| 3,205,777 A | * | 9/1965 | Brenner | 248/480 |
| 3,235,294 A | * | 2/1966 | Naylor et al. | 403/24 |
| 3,338,545 A | * | 8/1967 | Magi | 248/481 |
| 4,268,120 A | * | 5/1981 | Jitsumori | 359/850 |
| 4,685,779 A | | 8/1987 | Gonzalez | 350/604 |
| 6,104,552 A | | 8/2000 | Thau et al. | 359/726 |
| 6,247,821 B1 | | 6/2001 | Brewster | 359/841 |
| 6,286,966 B1 | | 9/2001 | Mandair et al. | 359/850 |
| 6,361,178 B1 | | 3/2002 | Lang et al. | 359/872 |
| 6,715,894 B1 | * | 4/2004 | Taylor | 359/862 |

* cited by examiner

*Primary Examiner*—Mark A. Robinson
(74) *Attorney, Agent, or Firm*—Goldstein Law Office, PC

(57) ABSTRACT

A safety mirror for attaching to a patrol car having a front, a driver side, and a driver side rear-view mirror, for use when an officer is walking back to the patrol car from a stopped vehicle located in front of the patrol car. The safety mirror has a housing having a front and a rear, a mirror surface located at the housing front, and a bracket extending rearwardly from the housing. The bracket is attached to the driver side door adjacent the rear view mirror, and the mirror surface is oriented forwardly. Accordingly when walking toward the patrol vehicle substantially alongside and parallel to the driver side, the officer can see the stopped vehicle in the mirror surface while simultaneously watching oncoming traffic.

3 Claims, 6 Drawing Sheets

PATROL VEHICLE SAFETY MIRROR

CROSS REFEERENCES AND RELATED SUBJECT MATTER

This application is a continuation-in-part of provisional patent application Ser. No. 60/396,307, filed in the United States Patent Office on Jul. 16, 2002.

BACKGROUND OF THE INVENTION

The invention relates to a patrol vehicle safety mirror. More particularly, the invention relates to a mirror which mounts onto a patrol vehicle, and is forwardly oriented therefrom, for allowing an officer to watch a stopped vehicle in front of the patrol vehicle, while the official is walking from the stopped vehicle back to the patrol vehicle.

It is often said that the most dangerous activity a police officer-routinely engages in is approaching a stopped vehicle. Even during a seemingly routine traffic stop and when a police officer takes every conceivable precaution, there still exists considerable danger.

One danger that has been seemingly unavoidable is encountered after a police officer has approached a stopped vehicle, and then walks back to the patrol car. During that time period, the officer is most vulnerable, since the officer's back is to the stopped vehicle. All too often at this point, the stopped vehicle suddenly drives off—or its driver or passenger attempts to harm the officer.

Another danger stems from oncoming traffic, as a well-trained officer tends to keep his/her eyes on the stopped driver while walking back to the patrol car. Unfortunately, this itself places the officer in "harms way", since the officer is often walking in a lane of traffic while not simultaneously watching the traffic—especially when the stopped patrol car is blocking a lane of traffic, and drivers are moving into the proximity of the officer who is walking back to his vehicle. In fact, numerous officers have been struck and killed by traffic in this very scenario.

Some attempts have been made to develop mirror systems that provide a forward view to a driver. However, these systems are intended to be used while seated in the vehicle—often to provide a view that cannot otherwise be obtained from the driver's vantage point. For example, U.S. Pat. No. 4,685,779 to Gonzales, U.S. Pat. No. 6,103,552 to Thau et al., U.S. Pat. No. 6,247,821 to Brewster, and U.S. Pat. No. 6,361,178 to Lan et al. disclose various systems that employ multiple mirrors or lenses to enhance the view of the driver.

While these units may be suitable for the particular purposes employed, or for general use they would clearly not be suitable for the purposes of the present invention, as described hereinafter.

SUMMARY OF THE INVENTION

In view of the foregoing problems inherent in the prior art, the present invention provides a safety mirror for use with a patrol car. As such, the general purpose of the present invention, which will be described subsequently in greater detail, is to provide a new and improved safety mirror for attachment to a patrol car which has all the advantages of the prior art and none of the disadvantages and as such addresses a significant safety concern of police officers.

It is an object of the invention to safeguard an officer from harm while walking back to the patrol car from a vehicle stopped in front of the patrol car. Accordingly, the safety mirror is mounted adjacent a door of the patrol car and has a mirror surface that is oriented forward, to enable the officer to watch the mirror while walking to the patrol car so that the officer can at all times see the stopped vehicle while his/her back is turned to the stopped vehicle, while simultaneously allowing the officer to continuously fade and watch oncoming traffic.

It is a further object of the invention that the invention is convenient to use, and does not interfere with ordinary use of the patrol car. Accordingly, the mirror is preferably mounted on the driver's side, in the vicinity of the rear view mirror.

It is yet another object of the invention that the mirror is easy to install. Accordingly, a bracket is provided which allows quick and easy mounting to the driver side door immediately in front of the rear view mirror.

To attain this, the present invention essentially comprises a safety mirror for attaching to a patrol car having a front, a driver side, and a driver side rear-view mirror, for use when an officer is walking back to the patrol car from a stopped vehicle located in front of the patrol car. The safety mirror has a housing having a front and a rear, a mirror surface located at the housing front, and a bracket extending rearwardly from the housing. The bracket is attached to the driver side door adjacent the rear view mirror, and the mirror surface is oriented forwardly. Accordingly when walking toward the patrol vehicle substantially alongside and parallel to the driver side, the officer can see the stopped vehicle in the mirror surface while simultaneously watching oncoming traffic.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims, when the same are presented.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
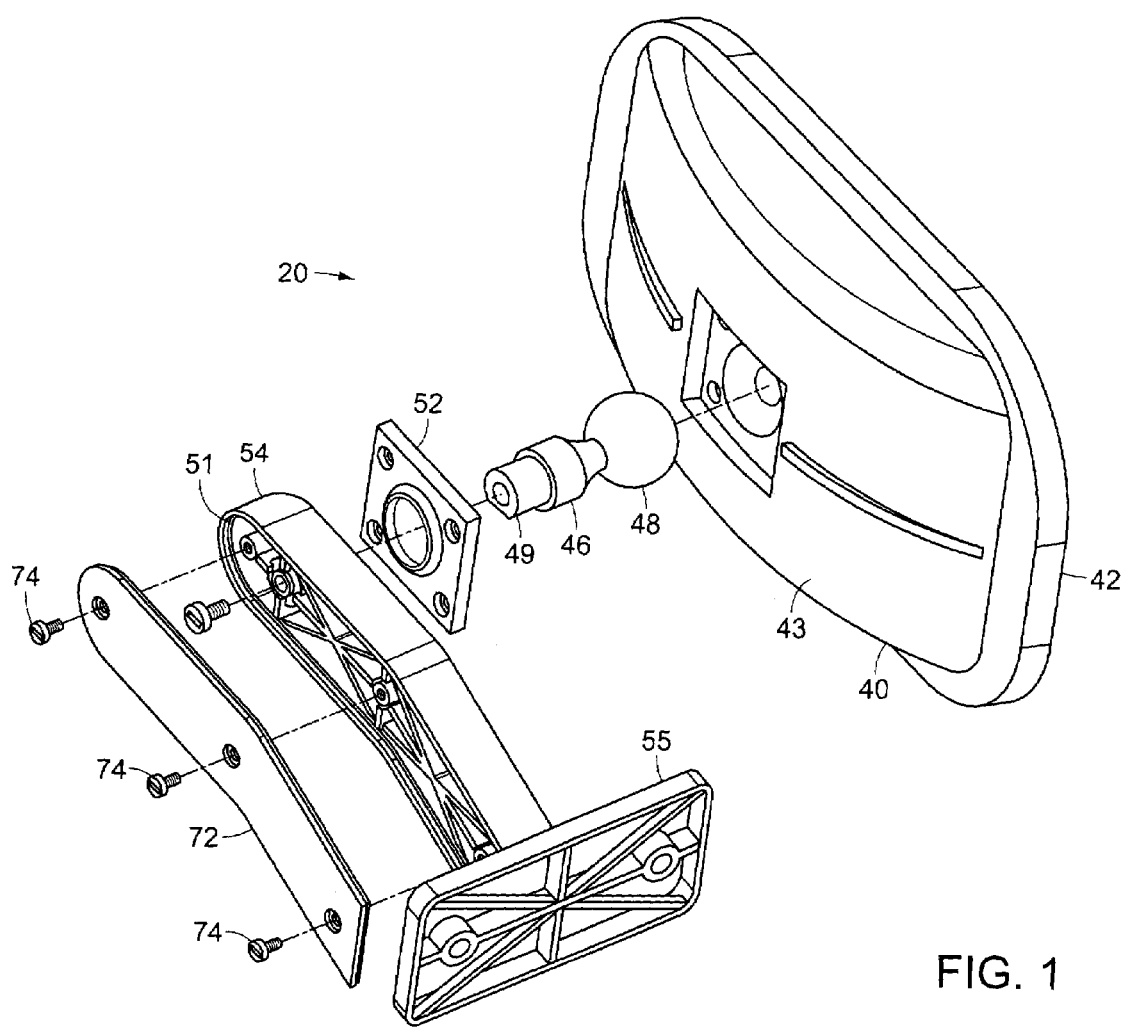
FIG. 1 is an exploded view, illustrating the relative positioning and assembly of the various components of the safety mirror according to the present invention.
Figure 2:
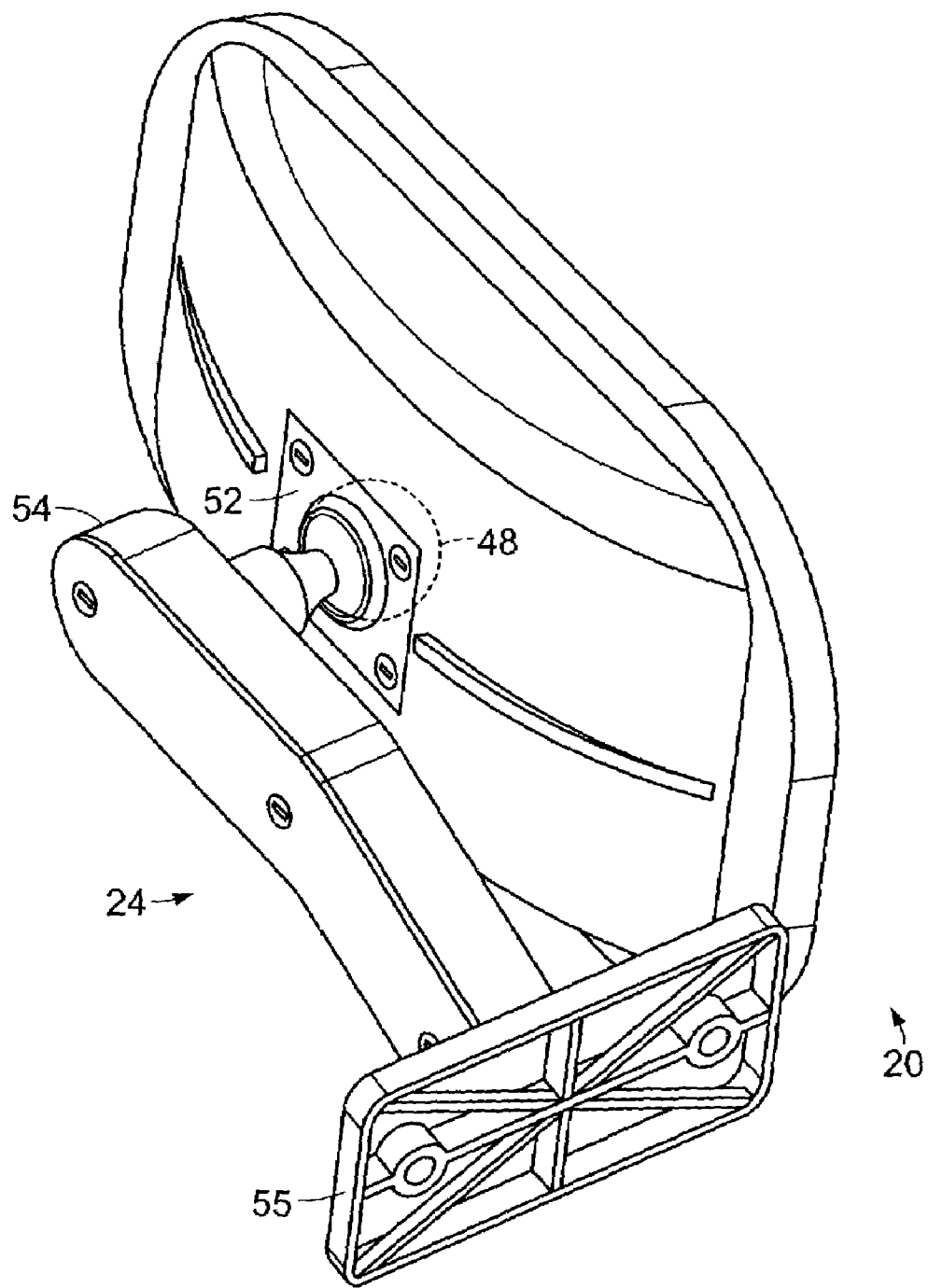
FIG. 2 is a rear perspective view, illustrating the components of the safety mirror fully assembled.
Figure 3:
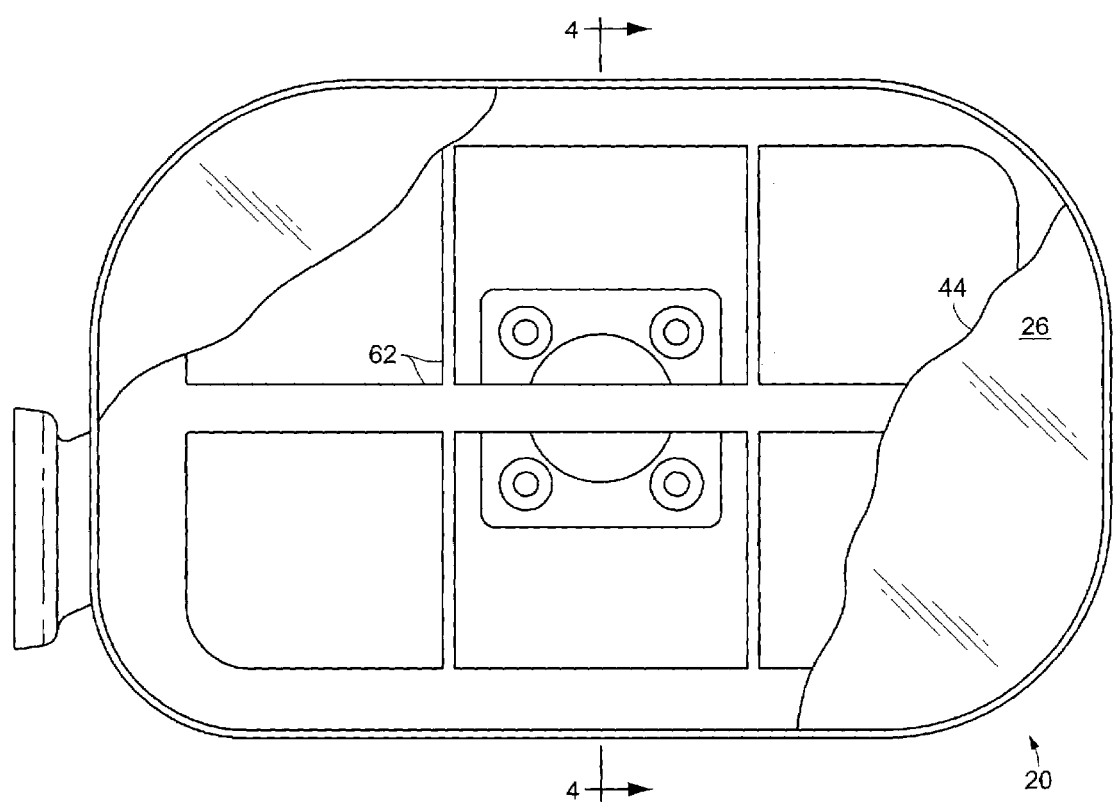
FIG. 3 is a front elevational view of the mirror, per se, with a portion of the mirror plate broken away to illustrate internal details of the main housing.
Figure 4:
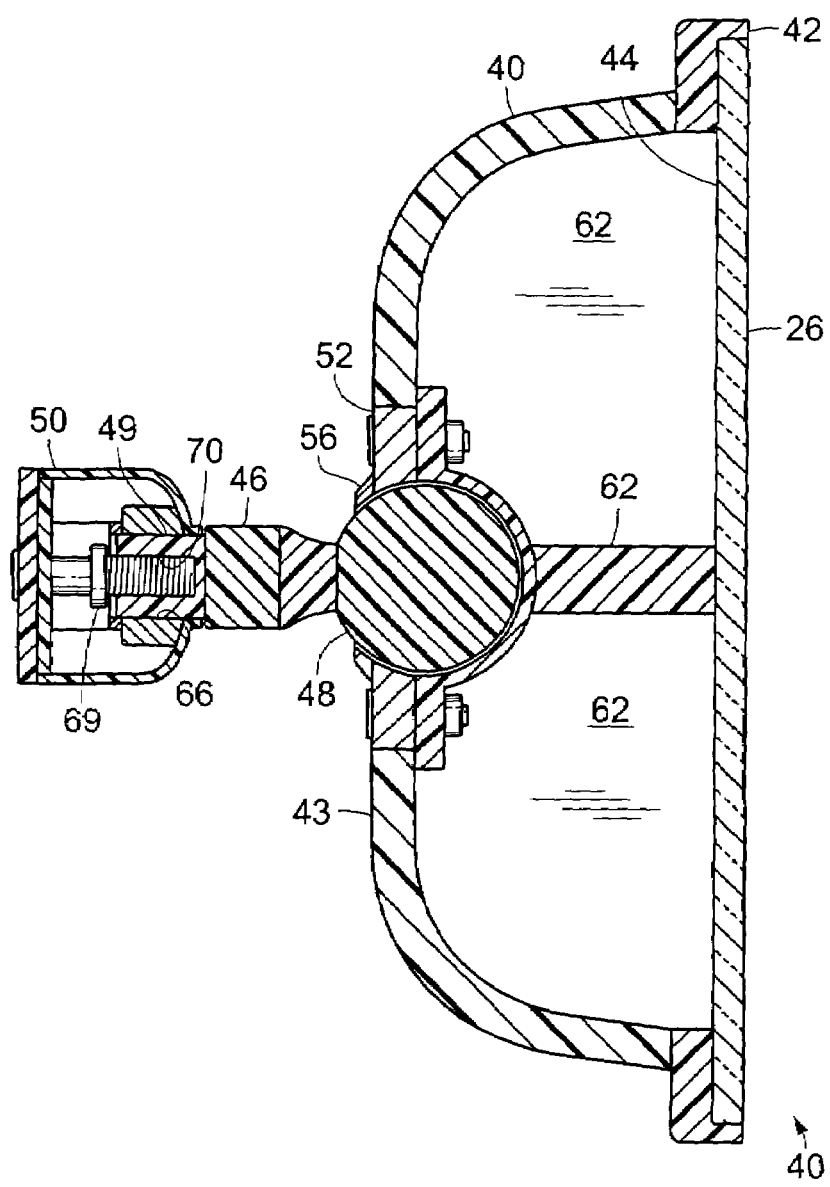
FIG. 4 is a cross sectional view, taken generally in the area of line 4—4 in FIG. 3, illustrating the ball and socket interconnection between the main housing and mounting bracket.
Figure 5:
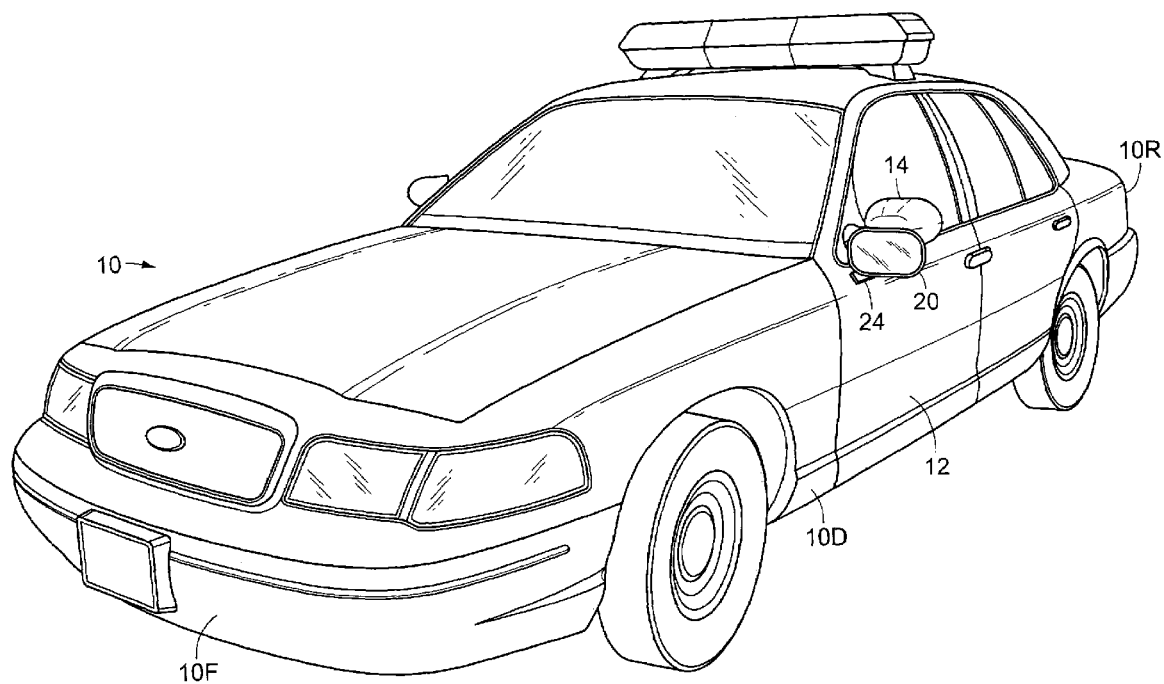
FIG. 5 is a diagrammatic perspective view of a patrol car, with one embodiment of the safety mirror according to the present invention mounted thereon.

FIG. 5 illustrates a patrol car 10 having a front 10F, a driver side 10D, a driver door 12 on the driver side 10D, a side mounted rear-view mirror 14 mounted adjacent the driver door 12. Also seen in FIG. 5, a safety mirror 20 is provided for mounting to the patrol car 10. In particular, the safety mirror 20 has a housing 40, having a front 42, a rear 43, and a mirror surface 26 located at the mirror front. Referring momentarily to FIG. 2, the safety mirror 20 has a mounting bracket 24 attached to the housing rear 43. The bracket 24 may be configured in numerous ways, but generally extends rearwardly from the housing rear 43 and facilitates attachment to the door 12 adjacent the side mounted rear-view mirror 14.

The mirror surface 26 is forwardly oriented, substantially parallel to the vehicle front 10F. Quite distinct from the myriad of mirrors ordinarily used and mounted to vehicles, the safety mirror as illustrated herein is intended to be used by individuals standing outside of and in front of the vehicle in viewing objects behind them.

Figure 6:
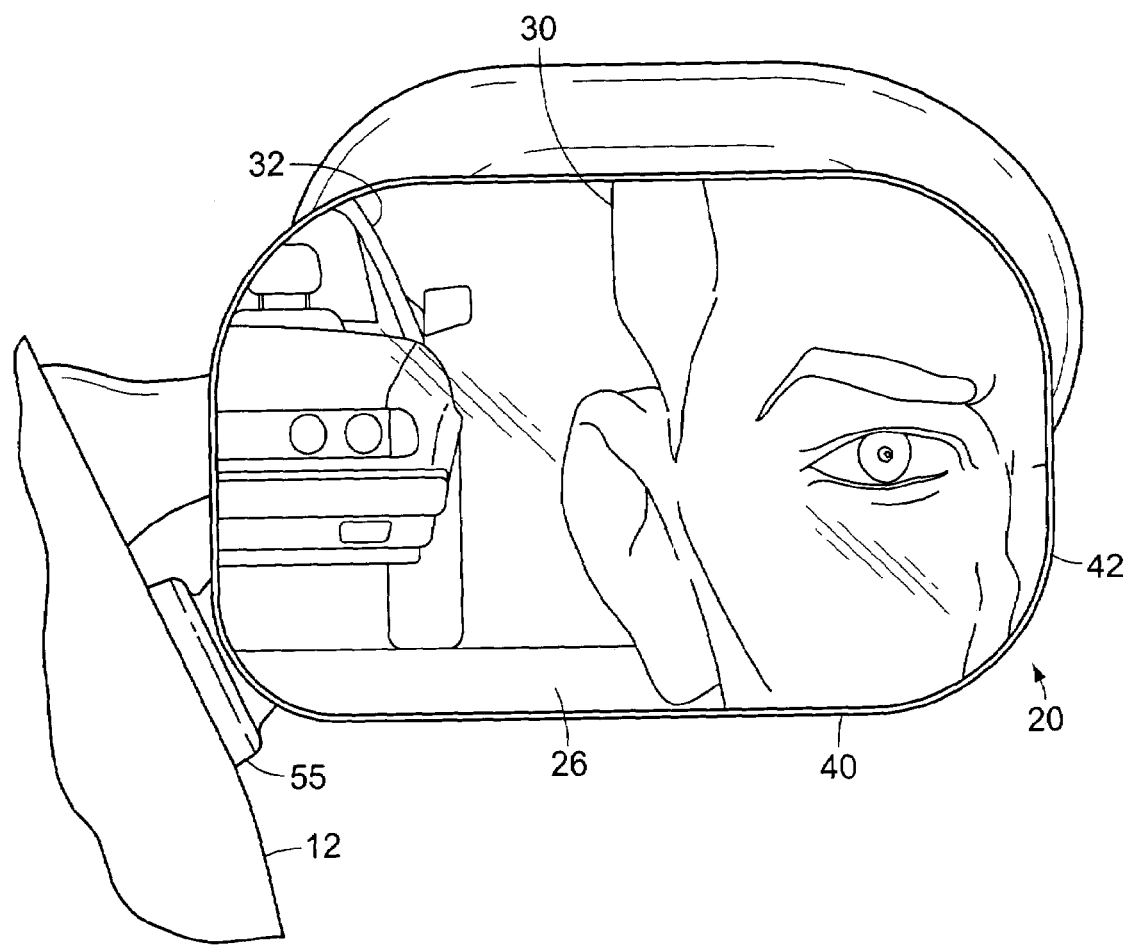
FIG. 6 is a front elevational view, illustrating the safety mirror in use, mounted to the patrol car with the mirror surface oriented forwardly, such that the police officer is able to watch the stopped vehicle while also watching oncoming traffic.

More particularly, referring to FIG. 6, a police officer 30 standing in front of the patrol car 10 may look directly at the mirror surface 26. When doing so, the police officer 30 is able to clearly see a stopped vehicle 11 which is located behind him (and in front of the patrol car), and which would otherwise be invisible to him. To accomplish the same, the mirror would clearly be optically configured so as to provide the clearest and largest view of the stopped vehicle taking into consideration the typical range that the stopped vehicle is likely to be located and where the officer is likely to be standing when such visual information is required.

In this regard, during use, the officer would likely position the patrol car immediately behind and slightly toward the left of the stopped vehicle, keeping the prospective viewing angle of the mirror in mind before parking the patrol car. For a fixed mounting of the safety mirror 20, this would seem to provide the most effective viewing position when the officer is walking in a straight line parallel and slightly alongside the driver side 10D of the patrol car 10. The officer can of course adjust his/her trajectory while looking into the safety mirror 20 to keep the stopped vehicle 32 in view while walking. Advantageously, with the mirror properly adjusted, the police officer can watch the stopped vehicle in the mirror, while facing oncoming traffic. Often, the patrol car is positioned within a lane of traffic, and when walking toward the patrol car is facing oncoming traffic within that lane. Accordingly, the police officer can simultaneously watch the driver of the stopped vehicle and potential hazards from oncoming traffic.

It should also be noted than an additional mirror may be provided on the passenger side of the patrol car, giving a second officer the benefit of viewing the stopped vehicle while returning to the passenger side of the patrol car. Such additional mirror may be mounted to the passenger side rear view mirror, or even to the upper left portion of the windshield.

In addition, the mirror 20 can be configured so that it is angularly adjustable by the officer. In particular, the mirror can be configured so that it can be adjusted by the officer as a matter of procedure before leaving the patrol car to approach the stopped vehicle, so that the mirror is aligned for the most effective use once the officer must return to the patrol vehicle. Accordingly, a sighting mechanism can be provided either through the mirror or immediately adjacent to the mirror to facilitate aiming the mirror at the desired viewing area.

As previously indicated, it is possible to attach the mirror to the spot light so that it is suitably aimed whenever the spotlight is pointed at the stopped vehicle. However doing the same might not be feasible, as it would almost require that the officer look directly at the beam emitted from the spot light in order to see the mirror surface. Accordingly, it is possible that the mirror be mounted to the spotlight, yet be mounted so that it is offset a sufficient distance from the beam.

In addition, to prevent possible inadvertent reflections of headlights, or other hazards caused by the forwardly facing mirror surface, the mirror might be configured with provisions to either selectively cover the mirror surface when not in use, or to redirect the mirror in an innocuous direction when not in use, while still allowing the mirror to be easily deployed when needed.

FIGS. 1 through 4 illustrate a preferred embodiment of the invention for economical and durable construction, wherein the mirror 20 includes a main housing 40 having a front 42 with a mirror plate 44 having the mirror surface 26 mounted at the front 42, a ball assembly 46 having a ball 48 and a plug 49 opposite from the ball, a mounting arm 50, and a mounting plate 52 that secures to ball 48 to the main housing 40 to allow the main housing to pivotally adjust with respect to the mounting arm 50. The mounting arm 50 is attached to the patrol car with a mounting arm flange plate 55.

In particular, the main housing 40 has a rear surface 43 which has a mounting plate seat 54 which is sized to accommodate the mounting plate 52 so that it rests flush with the rear surface 43. The mounting plate 52 has an open semi-spherical collar 56 that holds the ball 48 within the main housing 40, and allows the plug 49 to protrude rearwardly from the mounting plate 52. Best seen in FIG. 4, the main housing 40 has a socket 60 which accommodates substantially half of the ball 48 and allows the same to pivot therein. Best seen in FIG. 3, the mirror plate 44 is supported by a lattice 62 that supplies structural strength thereto—especially under wind stress. The lattice 62 extends rearwardly to the rear surface 43 of the housing and to the socket 60 to lend structural support 64 to the mirror plate 44.

During assembly, the ball 48 is inserted into the socket 60, and is fastened therein with the mounting plate 52 which seats securely within the mounting plate 54 of the main housing 40 rear surface 43. The mounting plate 54 is fastened to the rear surface 43 with screws, or other fasteners. The ball 48 is thereby held securely in the socket 60 by the mounting plate 54, and is permitted to rotate and pivot within said socket 60 by the spherical collar 56 of the mounting plate 52. The plug 49 protrudes rearwardly from the mounting plate 54, is held within a receptacle 66 in the mounting arm 50 and is fastened therein with a central screw 68 that extends within an axial bore 70 in the plug 49. The mounting arm 50 has a rear surface 51 that is open to allow the attachment of the plug 49 within the receptacle 66 using the central screw 68. The mounting arm 50 is closed with a mounting arm plate 72 which itself attaches to the mounting arm 50 with mounting arm plate screws 74.

The mounting arm 50 is attached to the patrol car 10 with the mounting arm flange plate 55. Preferably, the flange plate 55 is attached to the driver door 12

In conclusion, herein is presented a safety mirror that addresses a critical safety concern and prevalent vulnerability by allowing an officer to effectively watch a stopped vehicle while returning to the patrol car. The invention is illustrated by example in the attached drawing figures and in the foregoing description. Such is illustrative-only of the inventive concept. Numerous variations are possible while adhering to the principles of the present invention. Such variations are contemplated as being a part of the present invention.

What is claimed is:

1. A patrol vehicle safety mirror, for attaching to a patrol car having a front, a driver side, and a driver side rear-view mirror, for use when an officer is walking back to the patrol car from a stopped vehicle located in front of the patrol car, comprising:
- a mounting plate having a semi-spherical collar;
- a main housing, having a front and a rear surface, a socket adjacent to the rear surface, the rear surface having a mounting plate recess for accommodating the mounting plate flush with the rear surface of the main housing, a mirror plate attached at the front and is oriented forwardly for allowing the officer to view a reflection from the front; and
- a mounting arm, attached and extend from the rear of the main housing and extending laterally for mounting to the patrol car such that the front of the main housing is oriented in the direction of the front of the patrol car, the mounting arm having an open rear surface and a receptacle, wherein the mounting arm is attached to the main housing with a ball assembly having a plug having an axial bore, the plug extending into the receptacle wherein a central screw extends through the open rear surface of the mounting arm and extends into the axial bore for fastening the plug in the receptacle, the ball assembly also having a ball that is pivotally mounted within the socket, such that when the mounting plate is attached within the mounting plate recess the ball is accommodated between the socket and the semi-spherical collar for allowing the ball to rotate and pivot therein for allowing the main housing to pivotally adjust with respect to the mounting arm.

2. The safety mirror as recited in claim 1, wherein the mounting arm has a mounting arm flange for attaching the mounting arm flange to the door of the patrol car.

3. The safety mirror as recited in claim 2, further comprising a mounting arm cover, for attaching to and covering the open rear surface of the mounting arm following securement of the plug within the receptacle.

* * * * *